(12) United States Patent
Watchorn

(10) Patent No.: US 10,888,912 B2
(45) Date of Patent: Jan. 12, 2021

(54) SLEW-ACTUATED PIERCING OF RADIAL WALL

(71) Applicant: Inno-Spin LLC, Phillipsburg, NJ (US)

(72) Inventor: Doug Watchorn, Frenchtown, NJ (US)

(73) Assignee: Inno-Spin LLC, Phillipsburg, NJ (US)

( * ) Notice: Subject to any disclaimer, the term of this patent is extended or adjusted under 35 U.S.C. 154(b) by 198 days.

(21) Appl. No.: 16/029,401

(22) Filed: Jul. 6, 2018

(65) Prior Publication Data

US 2019/0009323 A1    Jan. 10, 2019

Related U.S. Application Data

(60) Provisional application No. 62/530,080, filed on Jul. 7, 2017.

(51) Int. Cl.
| | |
|---|---|
| *B21D 28/28* | (2006.01) |
| *B21D 53/16* | (2006.01) |
| *B21D 22/02* | (2006.01) |
| *F16H 21/44* | (2006.01) |
| *B21D 53/12* | (2006.01) |

(52) U.S. Cl.
CPC .......... *B21D 28/28* (2013.01); *B21D 22/025* (2013.01); *B21D 53/16* (2013.01); *F16H 21/44* (2013.01); *B21D 53/12* (2013.01)

(58) Field of Classification Search
CPC .... B21D 22/205; B21D 28/24; B21D 28/243; B21D 28/246; B21D 28/28; B21D 28/30; B21D 28/32; B21D 28/325; B21D 28/34; B21D 28/36; B21D 22/025; B21D 53/12; B21D 53/16; F16H 21/44
See application file for complete search history.

(56) References Cited

U.S. PATENT DOCUMENTS

| | | | | |
|---|---|---|---|---|
| 3,165,787 | A | * | 1/1965 | Carmack ............. B29C 33/0033 425/410 |
| 3,485,273 | A | * | 12/1969 | Springfield ............ D03D 49/36 139/161 S |
| 3,538,735 | A | * | 11/1970 | Zimmerman .......... B21D 28/28 72/324 |
| 4,616,540 | A | | 10/1986 | Morhard |
| 5,411,521 | A | * | 5/1995 | Putnam ............ A61B 17/06004 606/225 |

(Continued)

OTHER PUBLICATIONS

PCT/US2018/041145 International Search Report and Written Opinion dated Oct. 1, 2018, 13 pp.

*Primary Examiner* — Edward T Tolan
(74) *Attorney, Agent, or Firm* — Lathrop GPM LLP

(57) ABSTRACT

A slew-actuated stamping station includes an expandable core configured to apply radially outward pressure to a radially inward facing surface of a radial wall, and at least one slew-actuated punch for piercing, along a radially inward direction, a respective hole in the radial wall. A method for piercing a radial wall includes simultaneously (a) applying radially outward pressure against a radially inward facing surface of the radial wall, and (b) driving a slew to actuate at least one punch to pierce, along direction opposite the radially outward pressure, at least one hole in the radial wall. A method for forming an object, having a radial wall with holes, includes forming a ring with a radial wall, and piercing at least one hole in the radial wall with at least one slew-actuated punch.

9 Claims, 17 Drawing Sheets

(56) References Cited

U.S. PATENT DOCUMENTS

| | | | | |
|---|---|---|---|---|
| 5,634,367 | A * | 6/1997 | Yamada | B30B 7/04 |
| | | | | 72/402 |
| 8,777,555 | B1 * | 7/2014 | Balbir | F03B 13/264 |
| | | | | 415/3.1 |
| 9,283,613 | B2 * | 3/2016 | Van Essen | B21D 39/046 |
| 2005/0051009 | A1 | 3/2005 | Sanderson | |
| 2006/0213344 | A1 * | 9/2006 | Yamamoto | B21D 28/26 |
| | | | | 83/39 |
| 2011/0091144 | A1 | 4/2011 | Oishi et al. | |
| 2015/0174639 | A1 * | 6/2015 | Beyfuss | F16C 33/543 |
| | | | | 29/898.067 |

* cited by examiner

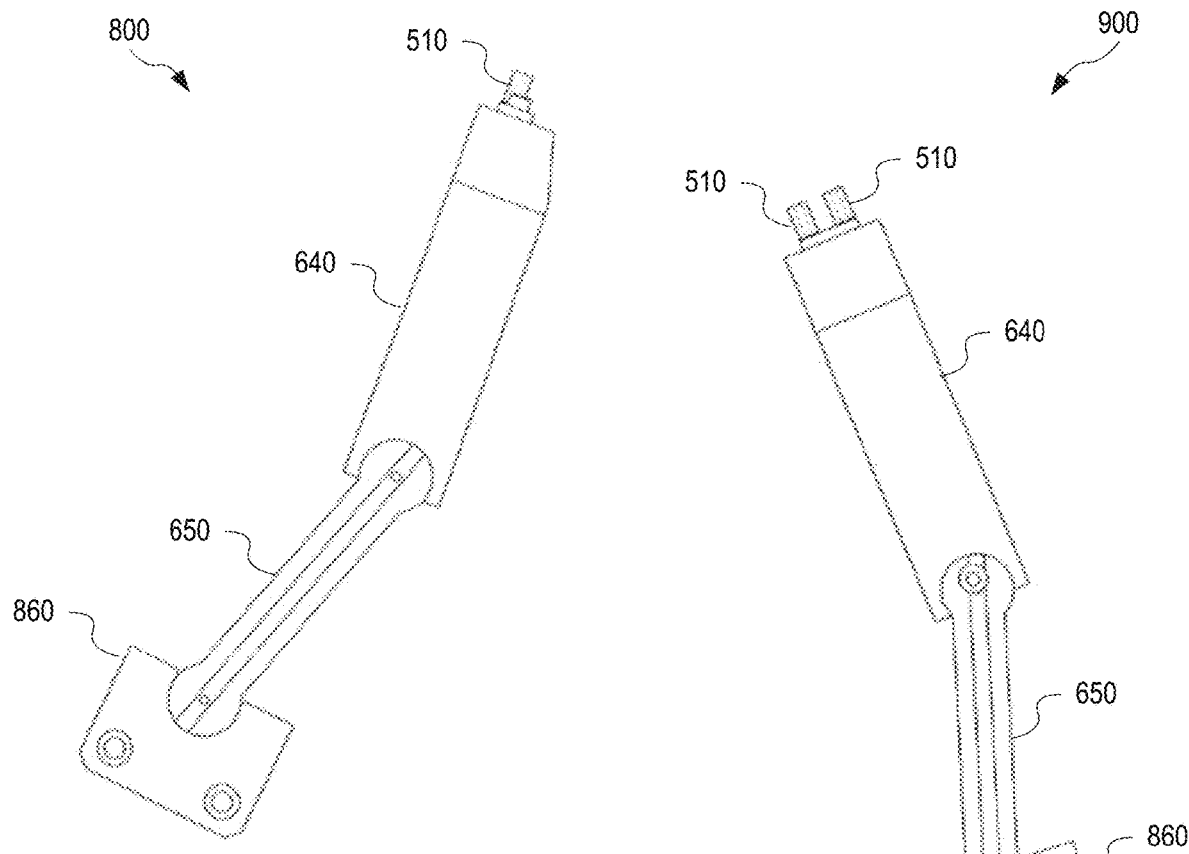
FIG. 8
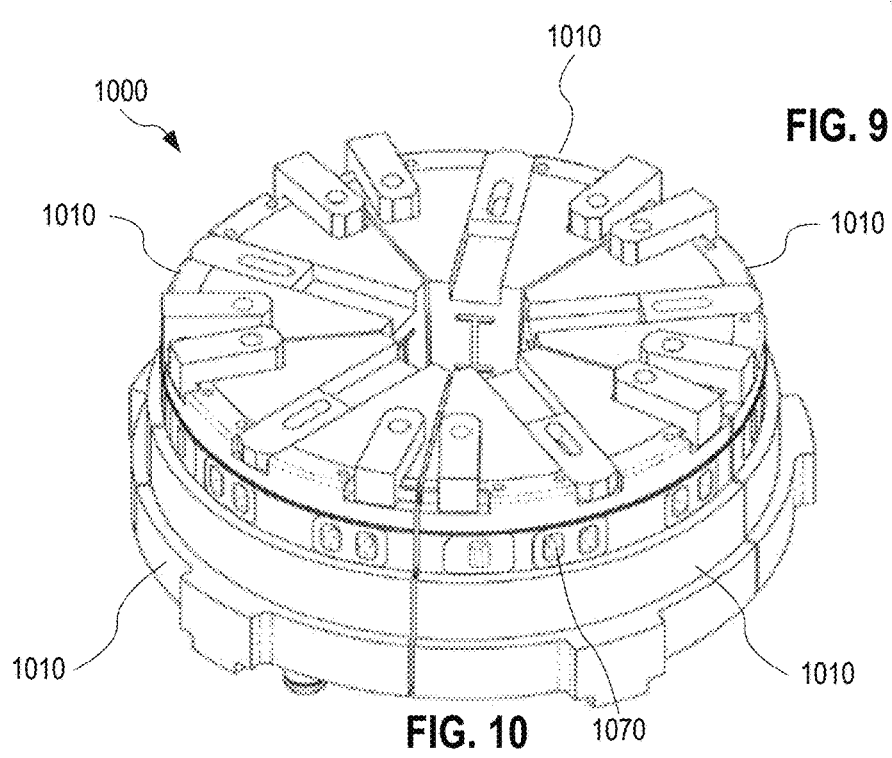
FIG. 9
FIG. 10

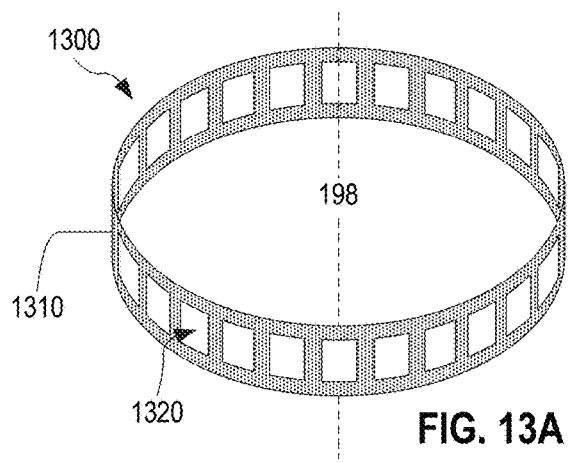
FIG. 13A
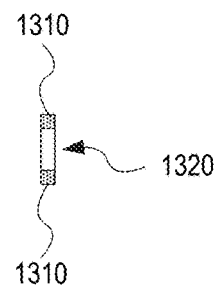
FIG. 13B
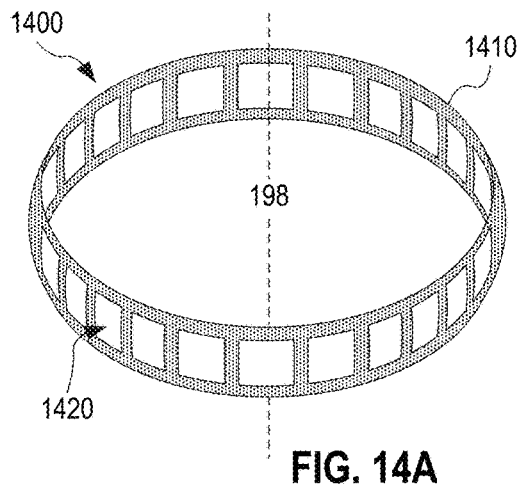
FIG. 14A
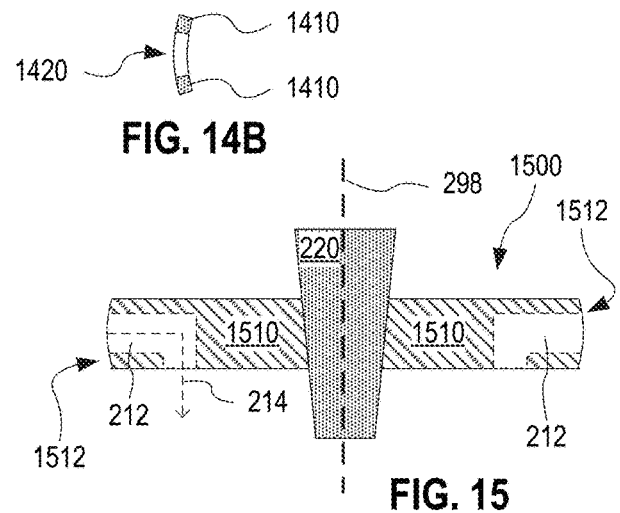
FIG. 14B
FIG. 15
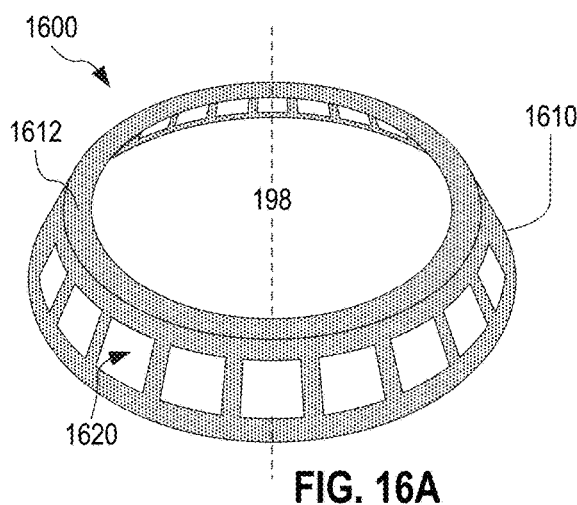
FIG. 16A
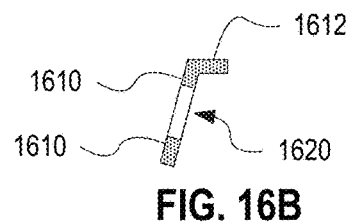
FIG. 16B
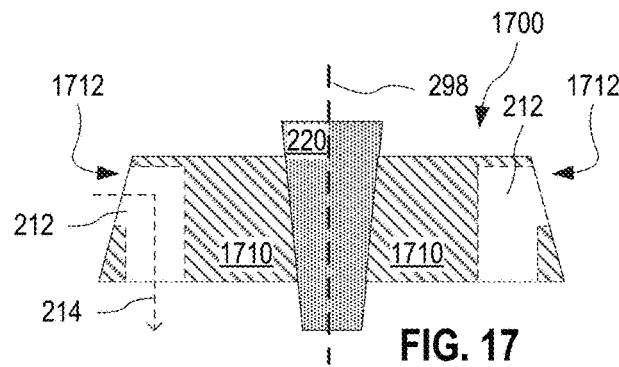
FIG. 17

2100

2110 — APPLY RADIALLY OUTWARD PRESSURE AGAINST RADIALLY INWARD FACING SURFACE OF RADIAL WALL

2112 — EXPAND CORE TO APPLY RADIALLY OUTWARD PRESSURE

2114 — ACHIEVE FINAL SHAPE/SIZE OF RADIALLY INWARD FACING SURFACE

2116 — PREVENT BURS IN RADIAL WALL

2118 — PREVENT DISTORTION OF RADIAL WALL

2120 — DRIVE SLEW TO ACTUATE AT LEAST ONE PUNCH TO PIERCE, ALONG DIRECTION OPPOSITE THE RADIALLY OUTWARD PRESSURE, AT LEAST ONE HOLE IN THE RADIAL WALL

2122 — DRIVE SLEW TO ROTATE DRIVE RING, COUPLED TO SLEW AND EACH PUNCH, SO AS TO MOVE EACH PUNCH

2124 — GUIDE MOVEMENT OF EACH PUNCH ALONG RADIALLY-INWARD DIRECTION TO PIERCE THE RADIAL WALL

FIG. 21

SLEW-ACTUATED PIERCING OF RADIAL WALL

CROSS-REFERENCE TO RELATED APPLICATIONS

The present application claims the benefit of priority from U.S. Provisional Application Ser. No. 62/530,080 filed Jul. 7, 2017, which is incorporated herein by reference in its entirety.

BACKGROUND

Sheet metal rings with holes in the side wall are typically produced by punching the holes in the sheet metal and, subsequently, bending the sheet metal to form the ring. In such systems, the sheet metal may be passed through a hole punch machine that uses a single punch to punch each individual hole sequentially.

SUMMARY

In an embodiment, a slew-actuated stamping station includes an expandable core configured to apply radially outward pressure to a radially inward facing surface of a radial wall, and at least one slew-actuated punch for piercing, along a radially inward direction, a respective hole in the radial wall.

In an embodiment, a method for piercing a radial wall includes simultaneously (a) applying radially outward pressure against a radially inward facing surface of the radial wall, and (b) driving a slew to actuate at least one punch to pierce, along direction opposite the radially outward pressure, at least one hole in the radial wall.

In an embodiment, a method for forming an object, having a radial wall with holes, includes forming a ring with a radial wall, and piercing at least one hole in the radial wall with at least one slew-actuated punch.

BRIEF DESCRIPTION OF THE DRAWINGS

FIG. 8 illustrates a punch assembly having a single punch, according to an embodiment.

FIG. 9 illustrates a punch assembly having two punches, according to an embodiment.

FIG. 10 illustrates an expandable core including a plurality of die segments, according to an embodiment.

FIGS. 13A and 13B illustrate a cylindrical ring that has been pierced in stamping station, according to an embodiment.

FIGS. 14A and 14B illustrate a pierced ring with a circumference that varies along the axial dimension, according to an embodiment.

FIG. 15 illustrates an expandable core having rounded die segments, according to an embodiment.

FIGS. 16A and 16B illustrate another pierced ring with a circumference that varies in the axial dimension, according to an embodiment.

FIG. 17 illustrates an expandable core having conical die segments, according to an embodiment.

FIG. 21 is a flowchart of a method for slew-actuated piercing a radial wall, according to an embodiment.

DETAILED DESCRIPTION OF THE EMBODIMENTS

Figure 1:
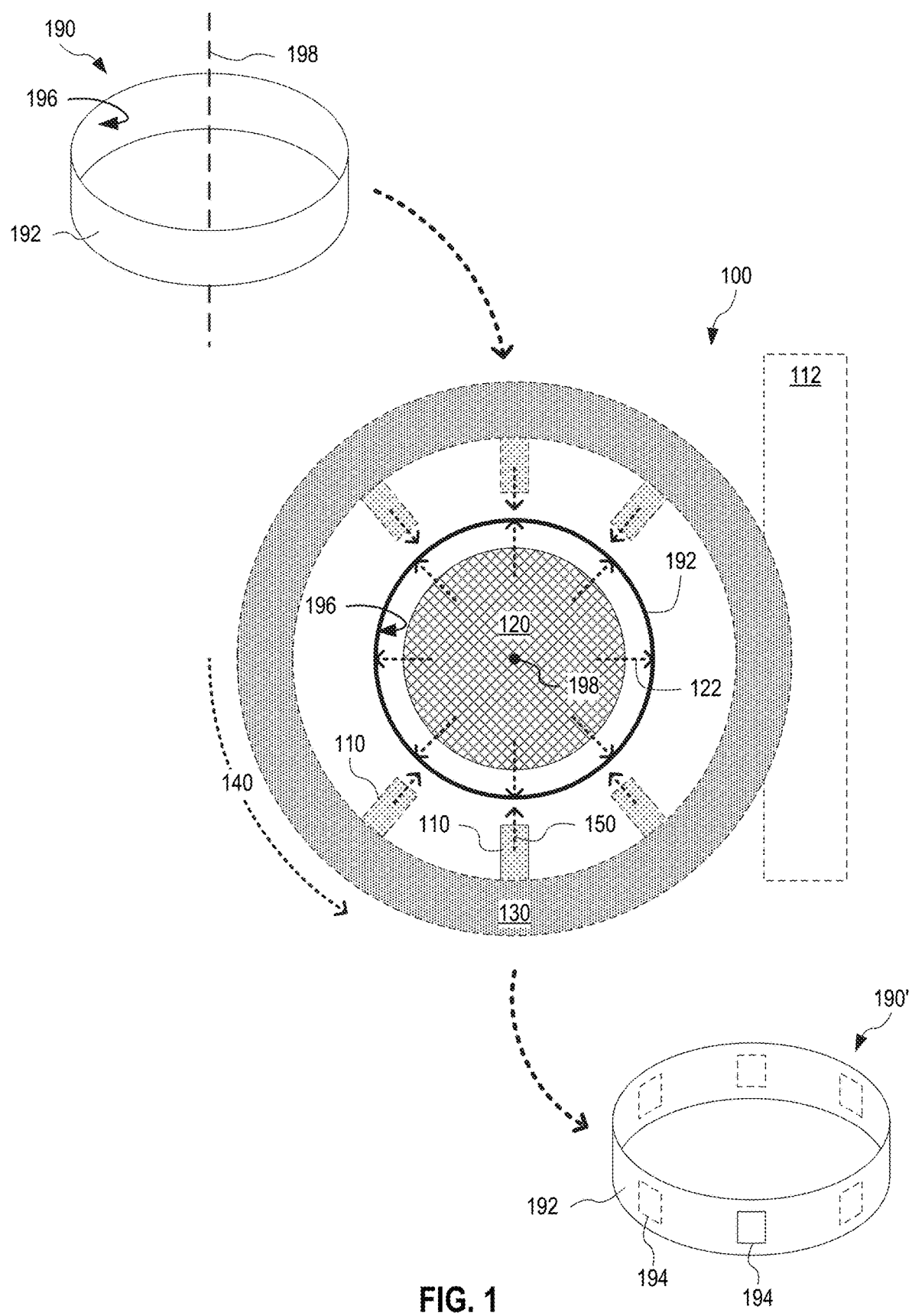
FIG. 1 illustrates a slew-actuated stamping station, according to an embodiment.

FIG. 1 illustrates one slew-actuated stamping station 100 Stamping station 100 is configured to pierce one or more holes in a ring-shaped part having a radial wall. Stamping station 100 may form several holes in the radial wall in a single punching operation. Stamping station 100 includes an expandable core 120 that holds a part 190 having a radial wall 192. When expanded, core 120 applies radially outward pressure 122 to a radially inward facing surface 196 of radial wall 192.

Herein, "radially inward" refers to a direction that is substantially toward an axis 198 of part 190, and "radially outward" refers to a direction that is substantially away from axis 198. In one example, part 190 has cylinder symmetry and axis 198 is the cylinder axis. In another example, the intended use of part 190 (when finished) involves rotation about a rotation axis inside radial wall 192, and axis 198 is the rotation axis. The radially inward and radially outward directions may deviate from being exactly perpendicular to axis 198, without departing from the scope hereof. For example, for a cylindrical embodiment of radial wall 192, the radially inward and radially outward directions may deviate somewhat from perpendicular incidence on radial wall 192, such as by up to 10 or 45 degrees.

Stamping station 100 further includes at least one slew actuated punch 110 that moves along a radially inward direction 150. Each punch 110 thereby pierces a respective hole 194 in radial wall 192. Each punch 110 moves to perform the piercing operation in a single slew-actuated move. Embodiments of stamping station 100 equipped with a plurality of punches 110 are capable of simultaneously forming a plurality of holes 194 in radial wall 192, wherein the plurality of holes 194 may be located at different azimuthal positions (relative to axis 198).

Expandable core 120 enables a tight fit of inward facing surface 196 of part 190 onto core 120. In exemplary operation, part 190 is placed in stamping station around expandable core 120 with expandable core being sized smaller than inward facing surface 196. Subsequently, expandable core 120 is expanded to form a tight fit with inward facing surface 196. This tight fit secures part 190 in stamping station 100. In addition, expandable core 120 may, by virtue of radially outward pressure 122, shape and/or size radial wall 192 to achieve a desired final shape and/or size. For example, the expandable core 120 may ensure that radially inward facing surface 196 has circular cross section at every axial position of radial wall 192. Without departing from the scope hereof, the shape and/or size of part 190 may be modified in later operations. In one example, the radially outward pressure applied by expandable core 120 improves the roundness of radial wall 192. In another example, expandable core 120 slightly expands radial wall 192 to achieve a final size. For non-cylindrical parts 190, for example a conical radial wall 192 or a radial wall 192 having several cylindrical sections with different diameters, the radially outward facing surface of core 120 applying the radially outward pressure may be shaped to match the shape of at least a portion of radially inward facing surface 196 (or a desired final shape/size thereof). Furthermore, the radially outward pressure applied by core 120 during piercing of radial wall 192 may serve to prevent distortion of radial wall 192 during the piercing operation. The radially outward pressure applied by core 120 during piercing of radial wall 192 may also serve to prevent formation of burrs at holes 194 during the piercing operation.

In one embodiment, stamping station 100 includes a drive ring 130 and at least one slew 112 that drives rotation of drive ring 130 along a substantially azimuthal direction 140 (relative to axis 198) to move each punch 110 along a respective radially inward direction 150. Each slew 112 may be coupled with a drive, such as a servo drive, that drives the rotation of slew 112.

Figure 2A:
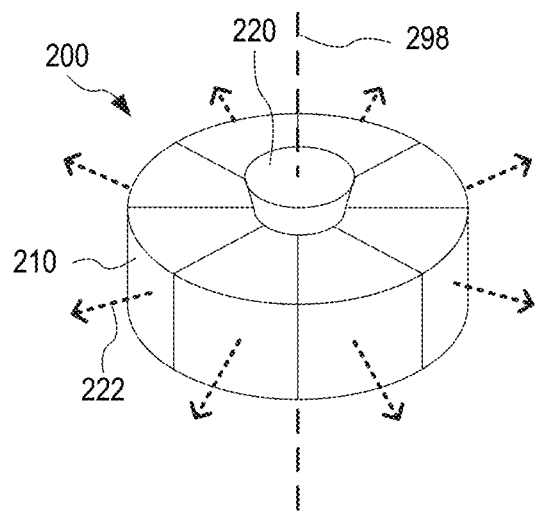
FIGS. 2A and 2B illustrate an expandable core that includes a plurality of die segments, according to an embodiment.
Figure 2B:
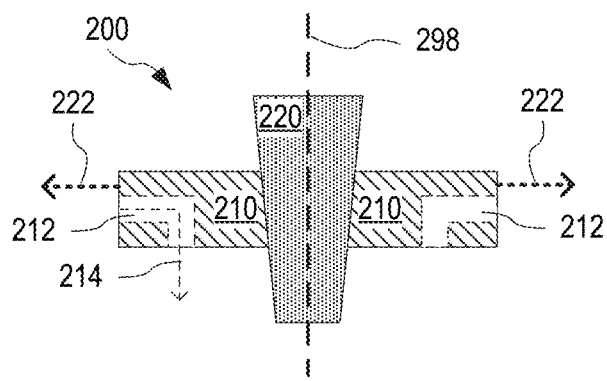

FIGS. 2A and 2B illustrate one expandable core 200 that includes a plurality of die segments 210. Die segments 210 are arranged about a tapered plunger 220. FIGS. 2A and 2B shows expandable core 200 and tapered plunger 220 in perspective view and cross-sectional side view, respectively. FIGS. 2A and 2B are best viewed together in the following description.

Expandable core 200 is an embodiment of expandable core 120 and may be implemented in stamping station 100 together with tapered plunger 220. In operation, when implemented in stamping system 100, tapered plunger 220 is lowered to push die segments 210 radially outward from an axis 298 along respective directions 222 to apply radially outward pressure 122. When implemented in stamping station 100 to hold part 190, axis 298 may coincide with axis 198.

In an embodiment, one or more of die segments 210 form a receptacle or chute 212 configured to accept respective punch 110, after punch 110 has pierced through radial wall 192, and/or to accept material pierced out of radial wall 192 by punch 110. Such material may pass through receptacle/chute 212 as indicated by arrow 214.

Figure 3A:
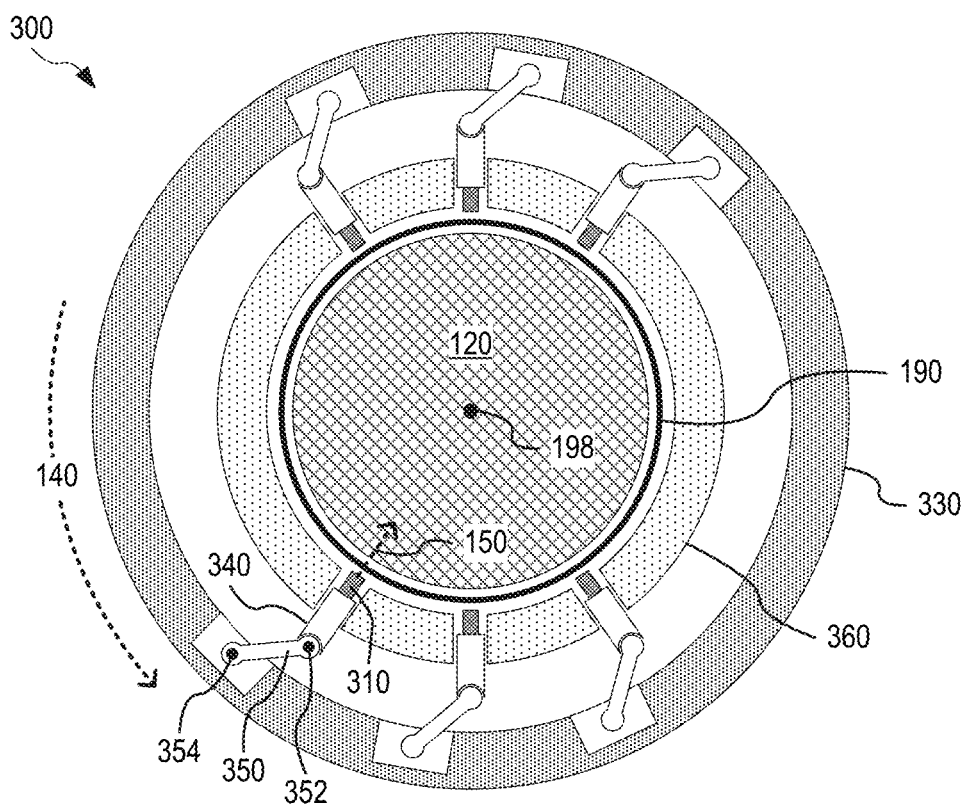
FIGS. 3A and 3B illustrate one embodiment of the slew-actuated stamping station of FIG. 1.
Figure 3B:
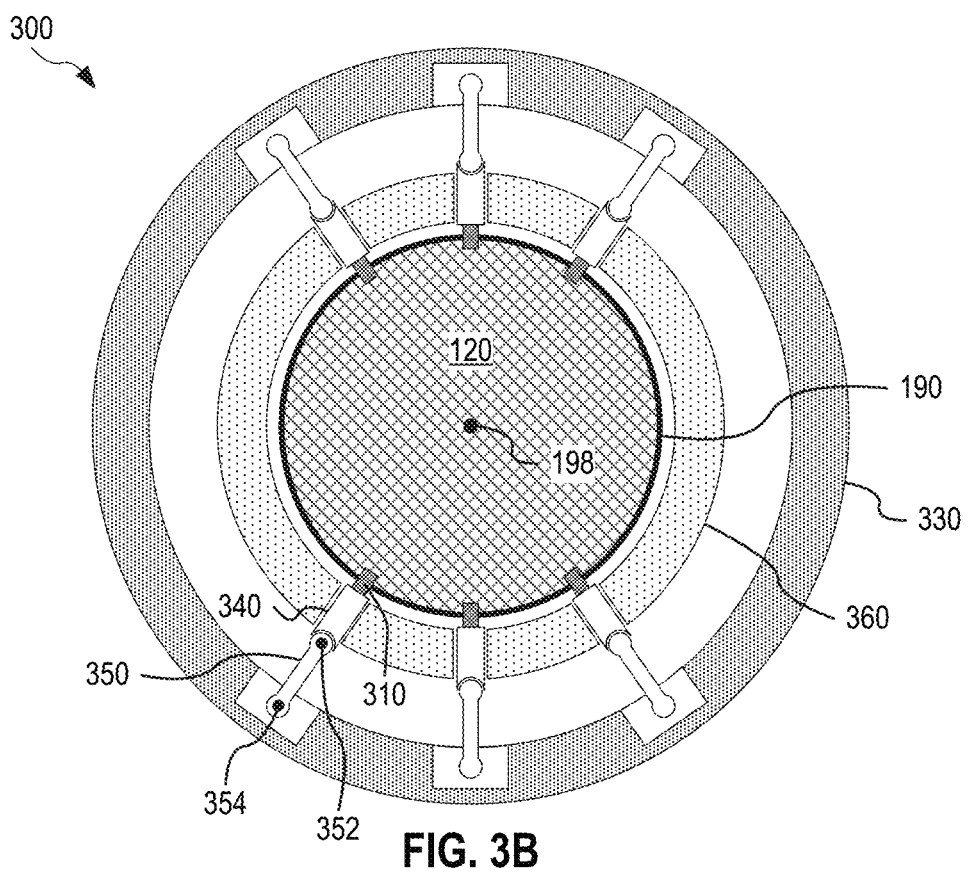

FIGS. 3A and 3B illustrate a slew-actuated stamping station 300 that is an embodiment of stamping station 100. FIG. 3A shows an initial configuration of stamping station 300 after having received part 190. FIG. 3B shows a configuration of stamping station 300 after piercing of radial wall 192 of part 190. FIGS. 3A and 3B are best viewed together.

Stamping station 300 includes a drive ring 330, at least one punch 310, and a guide 360. Stamping station 300 also includes expandable core 120, which may be implemented as expandable core 200 together with tapered plunger 220. Each punch 310 is mounted on a punch body 340 that is connected to drive ring 330 via a lever 350. Without departing from the scope hereof, each punch body 340 may have more than one punch 310 mounted thereto. Guide 360 restricts the motion of each punch body 340, and hence each punch 310, to be radially inward or radially outward. Although for clarity not depicted in FIGS. 3A and 3B, stamping station 300 may further include one or more slews 112 to actuate drive ring 330.

The joint between lever 350 and punch body 340 allows for pivoting of lever 350 about a pivot axis 352. The joint between lever 350 and drive ring 230 allows for pivoting of lever 350 about a pivot axis 354. Each of pivot axes 352 and 354 may be parallel to axis 198 (when part 190 is mounted in stamping station 300).

As shown in FIG. 3A, part 190 is mounted on expandable core 120 while (a) drive ring 330 is positioned such that each pivot axis 354 is at a different azimuthal position than the corresponding pivot axis 352 and (b) expandable core 120 is sized smaller than radial wall 192. This ensures that punch(es) 310 are retracted away from radial wall 192. Next, as shown in FIG. 3B, expandable core 120 is expanded and slew-actuation rotates drive ring 330 along direction 140. Upon this rotation, each pivot axis 354 is moved to an azimuthal position that is closer to the azimuthal position of the corresponding pivot axis 352. This results in movement of the corresponding punch body 340 radially inward, in guide 360 along radially inward direction 150, to pierce radial wall 192 with one or more punches 310 mounted on punch body 340. In the example shown in FIGS. 3A and 3B, each punch 310 is at its radially most inward position when lever 350 is parallel to punch body 340. In an embodiment, the azimuthal displacement of drive ring 330 between FIGS. 3A and 3B is in the range between 5 and 20 degrees. When piercing is complete, drive ring 330 may rotate back to the position shown in FIG. 3B. Alternatively, drive ring 330 may rotate in the same azimuthal direction 140 as from FIG. 3A to FIG. 3B until each punch 310 is retracted from radial wall 192.

Figure 4:
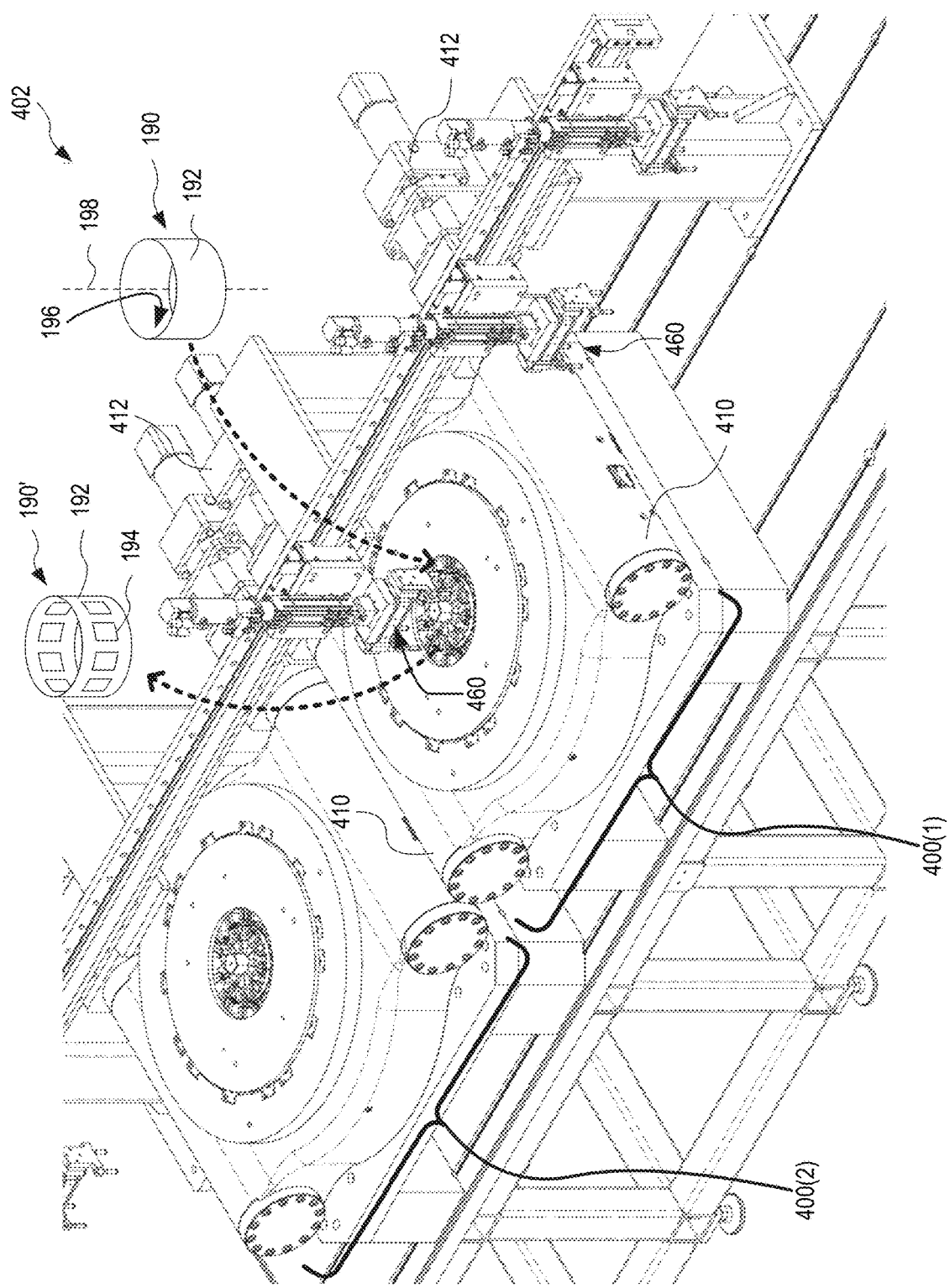
FIG. 4 illustrates two instances of a slew-actuated stamping station implemented in a stamping system, according to an embodiment.
Figure 5:
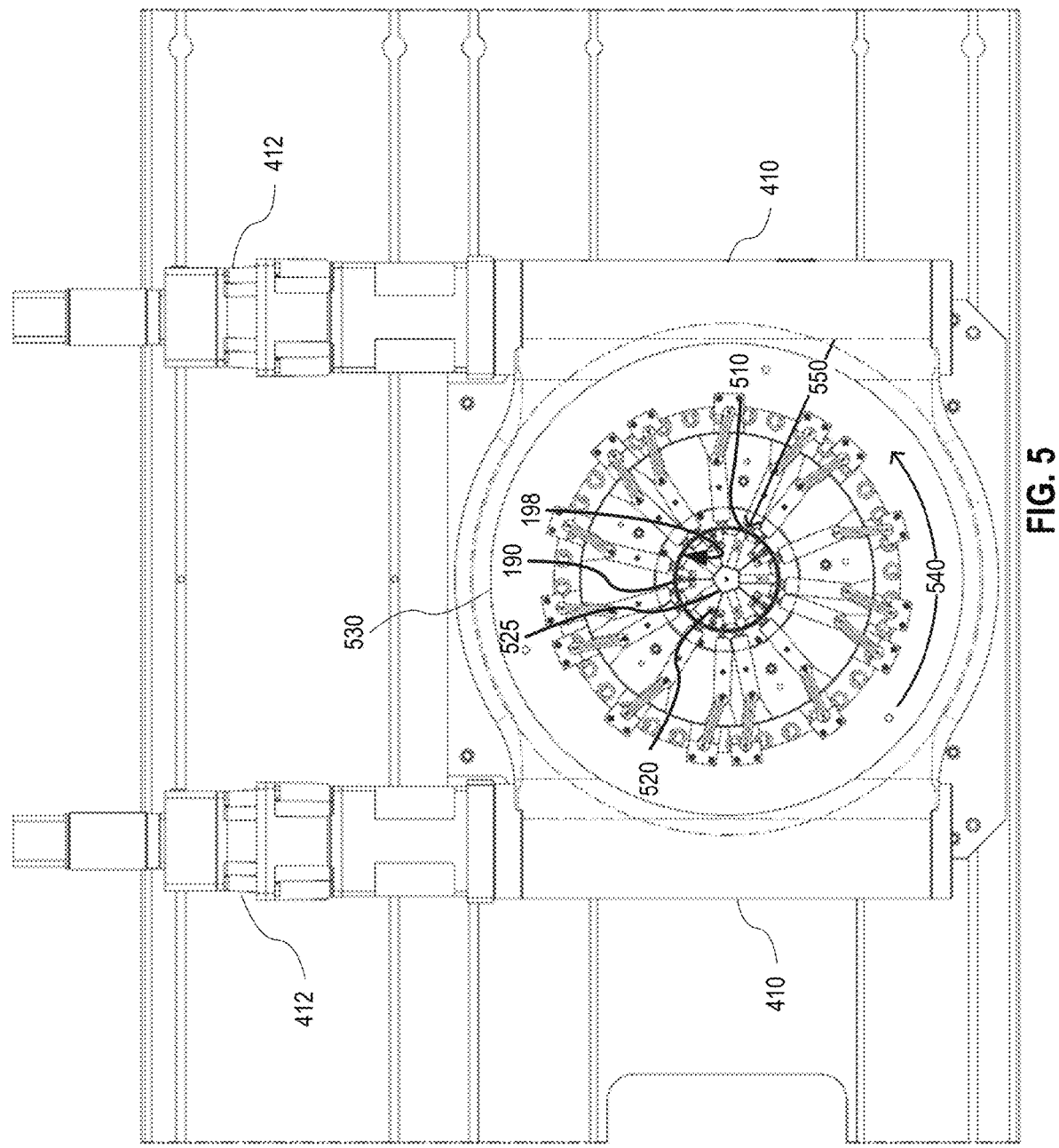
FIG. 5 is a top view of the stamping station of FIG. 4.

FIG. 4 illustrates two instances 400(1) and 400(2) of one slew-actuated stamping station 400 implemented in an exemplary stamping system 402. FIG. 5 is a top view of stamping station 400. Stamping station 400 is an embodiment of stamping station 100. FIGS. 4 and 5 are best viewed together in the following description.

Each stamping station 400 includes an expandable core 520 which is an embodiment of expandable core 200. Each stamping station 400 further includes a tapered plunger 525 which is an embodiment of tapered plunger 220. Each stamping station 400 also includes at least one slew 410 that actuates one or more punches 510 to move along a radially inward direction 550. In addition, each stamping station 400 includes a drive ring 530. Slew(s) 410 drive rotation of drive ring 530 along a substantially azimuthal direction 540 (relative to axis 198) to move each punch 510 along a respective radially inward direction 550. Each slew 410 may be coupled with a drive 412, such as a servo drive, that drives the rotation of slew 410. Stamping station 400 is an embodiment of stamping station 300. While the embodiment of stamping station 400 illustrated in FIGS. 4 and 5 includes two slews 410 and a plurality of punches 510, stamping station 400 may be configured with only a single slew 410, more than two slews 410, and/or only a single punch 510.

Stamping system 402 may include one or more grippers 460 that grip part 190 to move part 190 to different positions in stamping system 402. In one example, a first gripper 460 is configured to place part 190 in stamping station 400(1), a second gripper 460 is configured to move part 190 from stamping station 400(1) to stamping station 400(2), and a third gripper 460 is configured to extract part 190 from stamping station 400(2).

Without departing from the scope hereof, stamping system 402 may include additional instances of stamping station 400. Stamping system 402 may replace each of one or more stamping stations 400 with another embodiment of stamping station 100.

Figure 6:
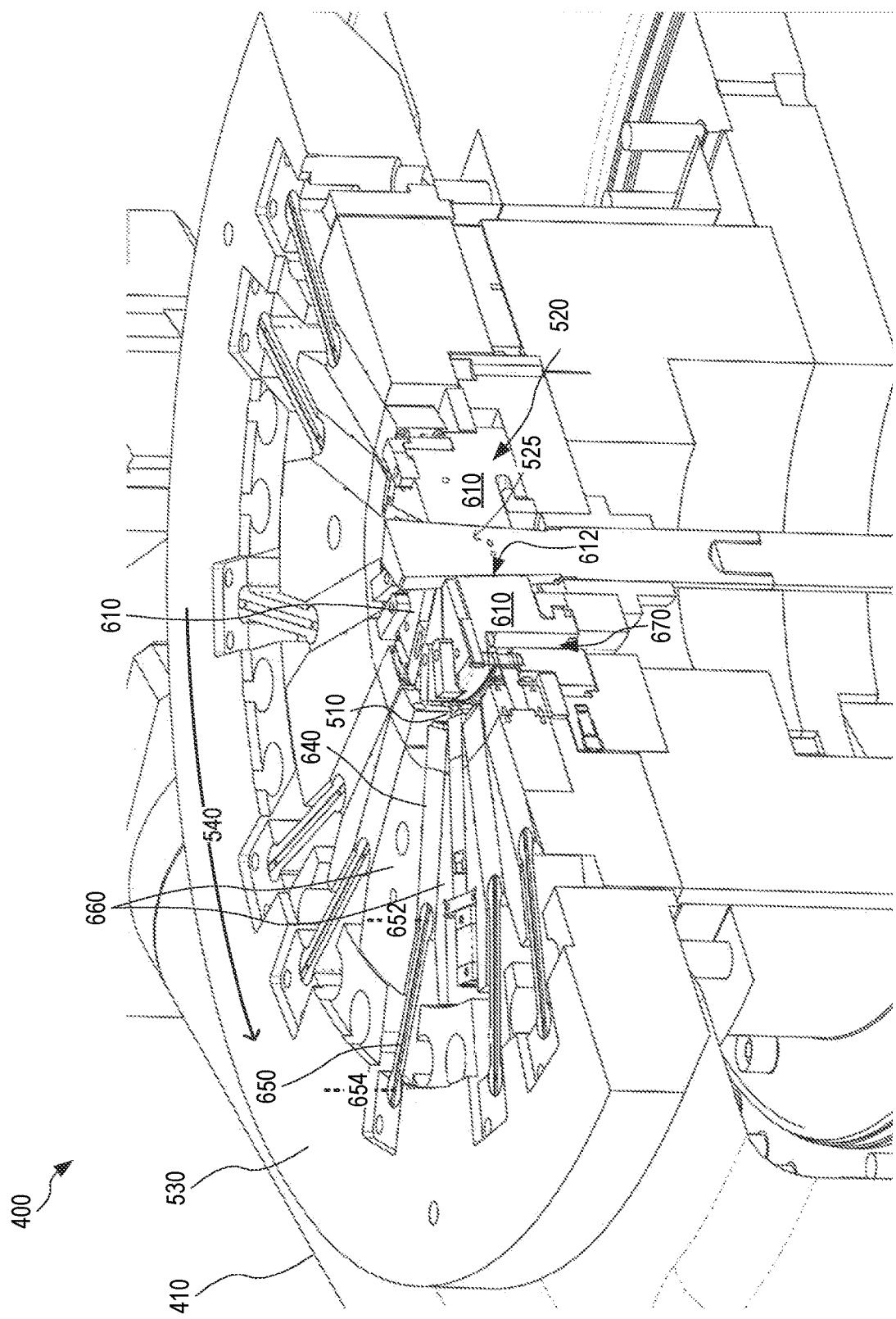
FIGS. 6 and 7 show the stamping station of FIGS. 4 and 5 in further detail.
Figure 7:
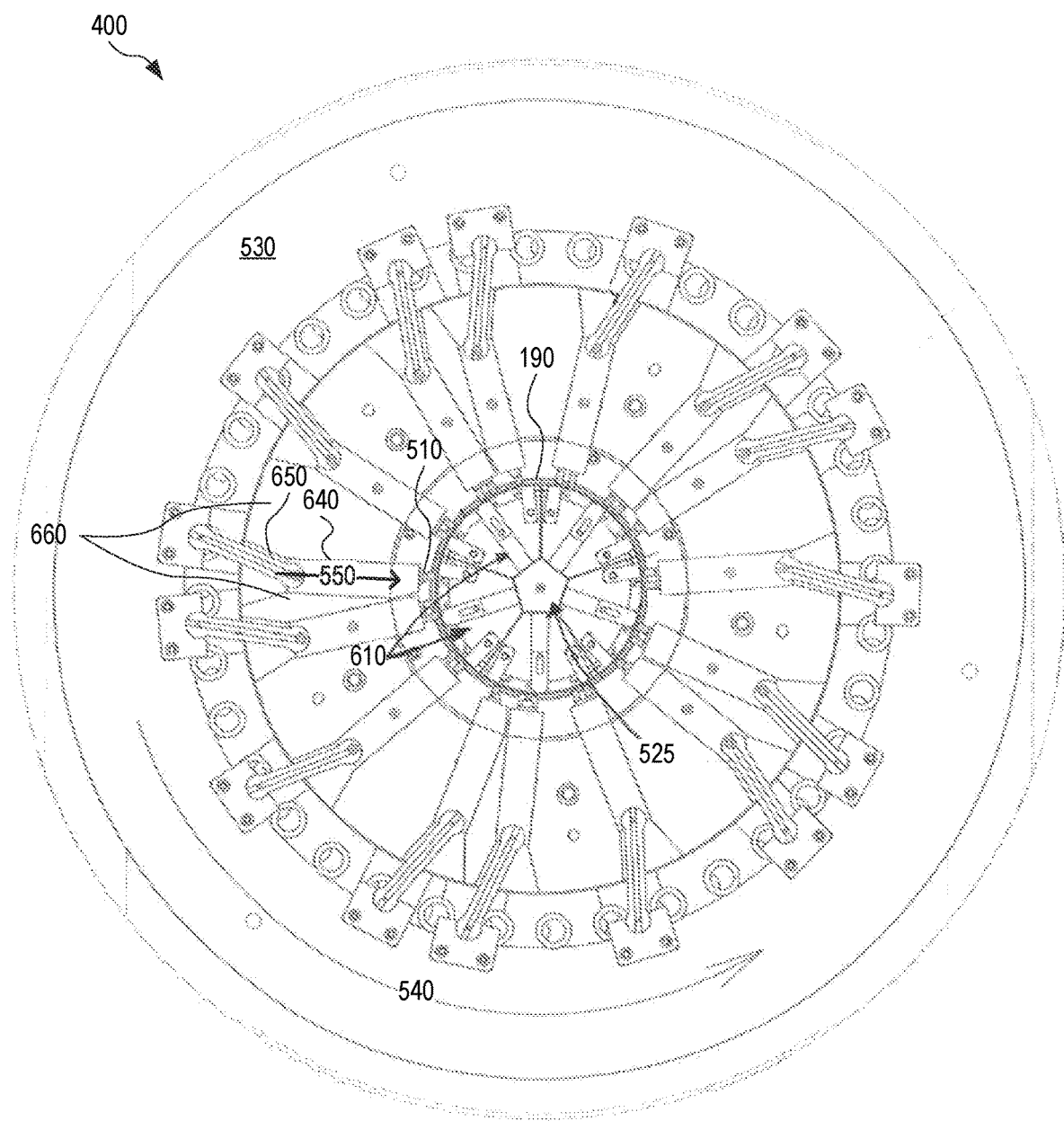

FIGS. 6 and 7 illustrate stamping station 400 in further detail. FIG. 6 shows a sectional view of stamping station 400, wherein the section cut coincides with the location of axis 198 when part 190 is mounted in stamping station 400. For clarity of illustration, FIG. 6 shows stamping station 400 without part 190 mounted therein. FIG. 7 shows a top view of stamping station 400 (not including slew(s) 410).

Expandable core 520 has a plurality of die segments 610. Die segments 610 and tapered plunger 525 meet at a tapered interface 612, such that lowering of tapered plunger 525 pushes die segments 610 radially outward, thereby expanding core 520.

Each punch 510 of stamping station 400 is mounted on a punch body 640. Each punch body 640 is connected to drive ring 530 via a lever 650. The joint between lever 650 and punch body 640 allows for pivoting of lever 650 about a pivot axis 652. The joint between lever 650 and drive ring 530 allows for pivoting of lever 650 about a pivot axis 654. Each of pivot axes 652 and 654 may be parallel to axis 198 (when part 190 is mounted in stamping station 400). Stamping station 400 further includes a guide 660 (an embodiment of guide 360) that restricts movement of each punch body 640 to a radially inward direction 550.

In an embodiment, each punch 510 is associated with a chute 670 in a corresponding one of die segments 610. Chute 670 receives material punched out of radial wall 192 by punch 510 and drops this material.

FIG. 8 illustrates one punch assembly 800 having a single punch 510. Punch assembly 800 may be implemented in stamping station 400. Punch assembly 800 includes punch body 640 and lever 650, configured as discussed above in reference to FIGS. 6 and 7. Punch assembly further includes a mount 860 configured to couple the distal end of lever 650 to drive ring 530. Punch body 640 has a single punch 510 mounted on the proximate end of punch body 640. Herein, "distal" and "proximate" refer to positions or parts that are further away from and closer to, respectively, axis 198 of part 190 when part 190 is mounted in the stamping station.

FIG. 9 illustrates one punch assembly 900 having two punches 510. Punch assembly 900 is similar to punch assembly 800 except for having two punches 510 mounted on the proximate end of punch body 640. Without departing from the scope hereof, punch assembly 900 may have more than two punches 510 mounted on the proximate end of punch body 640.

FIG. 10 illustrates an expandable core 1000 including a plurality of die segments 1010. Expandable core 1000 is an embodiment of expandable core 520, and die segment 1010 is an embodiment of die segment 610. Each die segment 1010, coinciding with a location for piercing by a punch 510, forms a receptacle 1070 for punch 510. Receptacle 1070 may continue through the die segment 1010 to form an example of chute 670.

Figure 11:
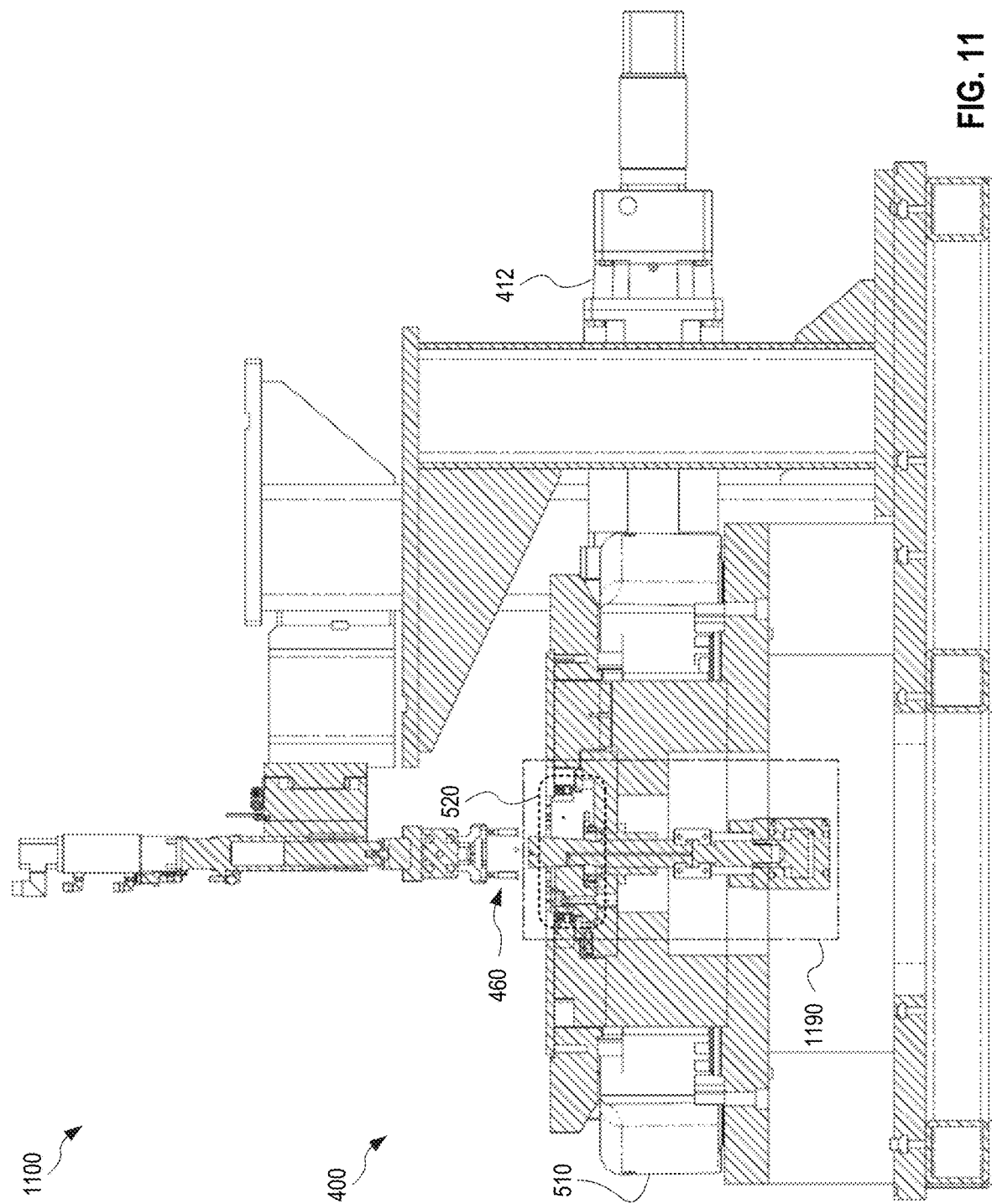
FIGS. 11 and 12 illustrate a stamping station 1100 with a gripper, according to an embodiment.
Figure 12:
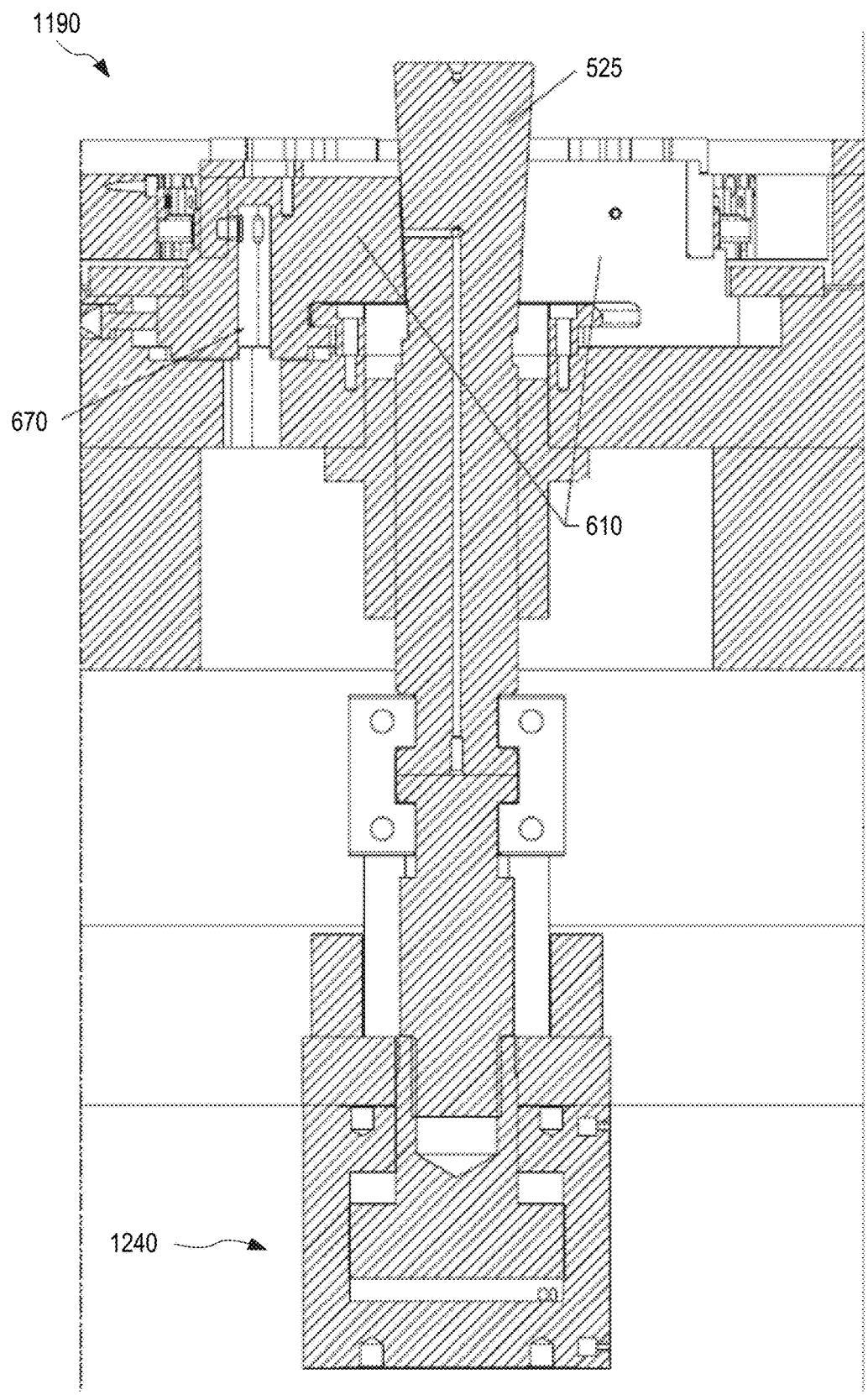

FIGS. 11 and 12 illustrate one exemplary stamping station 1100 that combines stamping station 400 with a gripper 460. FIG. 11 shows a sectional side view of stamping station 400. FIG. 12 shows a close-up of a portion 1190 of stamping station 1100. FIGS. 11 and 12 are best viewed together in the following description. In the embodiment shown in FIG. 12, stamping station 1100 includes a drive 1240 that controls the motion of tapered plunger 525 to expand or shrink expandable core 520.

Without departing from the scope hereof, stamping station 1100 may have more than one gripper 460. In one example, a first gripper 460 is configured to place part 190 in stamping station 400 and a second gripper 460 is configured to extract part 190 from stamping station 400.

FIGS. 13A and 13B illustrate one cylindrical ring 1300 that has been pierced in stamping station 100. FIG. 13A shows cylindrical ring 1300 in perspective view. FIG. 13B shows a cross sectional view of cylindrical ring 1300 with the cross section taken in a radial plan. FIGS. 13A and 13B are best viewed together in the following description. Cylindrical ring 1300 is a cylindrical wall 1310 with a plurality of holes 1320 formed therein by stamping station 100. The cylinder axis of cylindrical ring 1300 coincides with axis 198. In an embodiment, holes 1320 are equidistantly spaced in the azimuthal direction (relative to axis 198). Although FIG. 13A shows holes 1320 as being rectangular, holes 1320 may have a different shape without departing from the scope hereof. For example, holes 1320 may be circular, polygonal with three or more sides, or a more complex shape.

FIGS. 14A and 14B illustrate one pierced ring 1400 with a circumference that varies along the axial dimension. Ring 1400 has been pierced in stamping station 100. FIG. 14A shows ring 1400 in perspective view. FIG. 14B shows a cross sectional view of ring 1400 with the cross section taken in a radial plan. FIGS. 14A and 14B are best viewed together in the following description. Ring 1400 has a radial wall 1410 with a plurality of holes 1420 formed therein by stamping station 100. Any cross section of radial wall 1410, taken in a plane orthogonal to axis 198, is substantially circular (apart from missing portions at holes 1420). However, the diameter of the cross section varies along axis 198. In an embodiment, holes 1420 are equidistantly spaced in the azimuthal direction (relative to axis 198). Although FIG. 14A shows holes 1420 as being rectangular, holes 1420 may have a different shape without departing from the scope hereof as discussed above in reference to FIG. 13A. Also without departing from the scope hereof, the variation of the diameter along axis 198 may be different from that shown in FIGS. 14A and 14B.

FIG. 15 illustrates one expandable core 1500 having rounded die segments 1510. Expandable core 1500 is an embodiment of expandable core 200 that is configured to hold ring 1400 during piercing in stamping station 100. Each die segment 1510 has a rounded radially-outward-facing surface 1512 that matches the shape of ring radial wall 1410, such that, when tapered plunger 220 forces die segments 1510 radially outward, a tight fit is achieved between die segments 1510 and radial wall 1410. One or more die segments 1510 may form receptacle/chute 212. It is understood that radially-outward-facing surfaces 1512 may modify the shape of radial wall 1410 when expandable core 1500 is expanded against radial wall 1410, so as to achieve a final desired shape of radial wall 1410.

FIGS. 16A and 16B illustrate another pierced ring 1600 with a circumference that varies in the axial dimension. Ring 1600 has been pierced in stamping station 100. FIG. 16A shows ring 1600 in perspective view. Ring 1600 is formed from a single piece. FIG. 16B shows a cross sectional view of ring 1600 with the cross section taken in a radial plan. FIGS. 16A and 16B are best viewed together in the following description. Ring 1600 has a conical radial wall 1610 and a lip 1612 extending from conical radial wall inwards toward axis 198. Conical radial wall 1610 has a plurality of holes 1620 formed therein by stamping station 100. Any cross section of conical radial wall 1610, taken in a plan orthogonal to axis 198, is substantially circular (apart from missing portions at holes 1620). However, the diameter of the cross section varies along axis 198. In an embodiment, holes 1620 are equidistantly spaced in the azimuthal direction (relative to axis 198). Although FIG. 16A shows holes 1620 as being rectangular, holes 1620 may have a different shape without departing from the scope hereof as discussed above in reference to FIG. 13A. Also without departing from the scope hereof, the variation of the diameter along axis 198 may be different from that shown in FIGS. 16A and 16B. For example, the diameter of conical radial wall 1610 may decrease in the direction away from lip 1612, or conical radial wall 1610 may be at least partly replaced by a rounded wall similar to radial wall 1410 of ring 1400. In the embodiment shown in FIGS. 16A and 16B, lip 1612 is orthogonal to axis 198. Alternatively, lip 1612 may be at an oblique angle to axis 198.

FIG. 17 illustrates one expandable core 1700 having conical die segments 1710. Expandable core 1700 is an embodiment of expandable core 200 that is configured to hold ring 1600 during piercing in stamping station 100. Each die segment 1710 has an angled radially-outward-facing surface 1712 that matches the shape of ring radial wall 1610, such that, when tapered plunger 220 forces die segments 1710 radially outward, a tight fit is achieved between die segments 1710 and radial wall 1610. One or more die segments 1710 may form receptacle/chute 212. It is understood that radially-outward-facing surfaces 1712 may modify the shape of radial wall 1610 when expandable core 1700 is expanded against radial wall 1610, so as to achieve a final desired shape of radial wall 1610.

Figure 18:
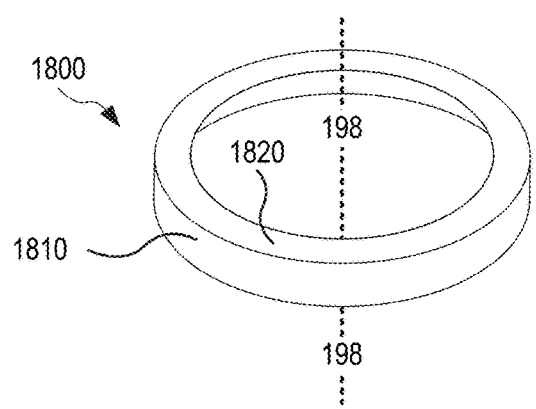
FIG. 18 illustrates a ring having a cylindrical wall and a lip extending from the cylindrical wall, according to an embodiment.

FIG. 18 illustrates one ring 1800 having a cylindrical wall 1810 and a lip 1820 extending from cylindrical wall 1810. Ring 1800 is formed from a single piece. Lip 1820 is orthogonal to axis 198. Ring 1800 may be placed in stamping station 100 for piercing of holes in cylindrical wall 1810.

For each of the embodiments discussed above in reference to FIGS. 13A-18, stamping station 100 may be configured with an expandable core having a radially outward facing surface that matches at least a portion of the inward facing surface of the radial wall to be pierced (e.g., wall 1310, 1410, 1610, or 1810).

Figure 19:
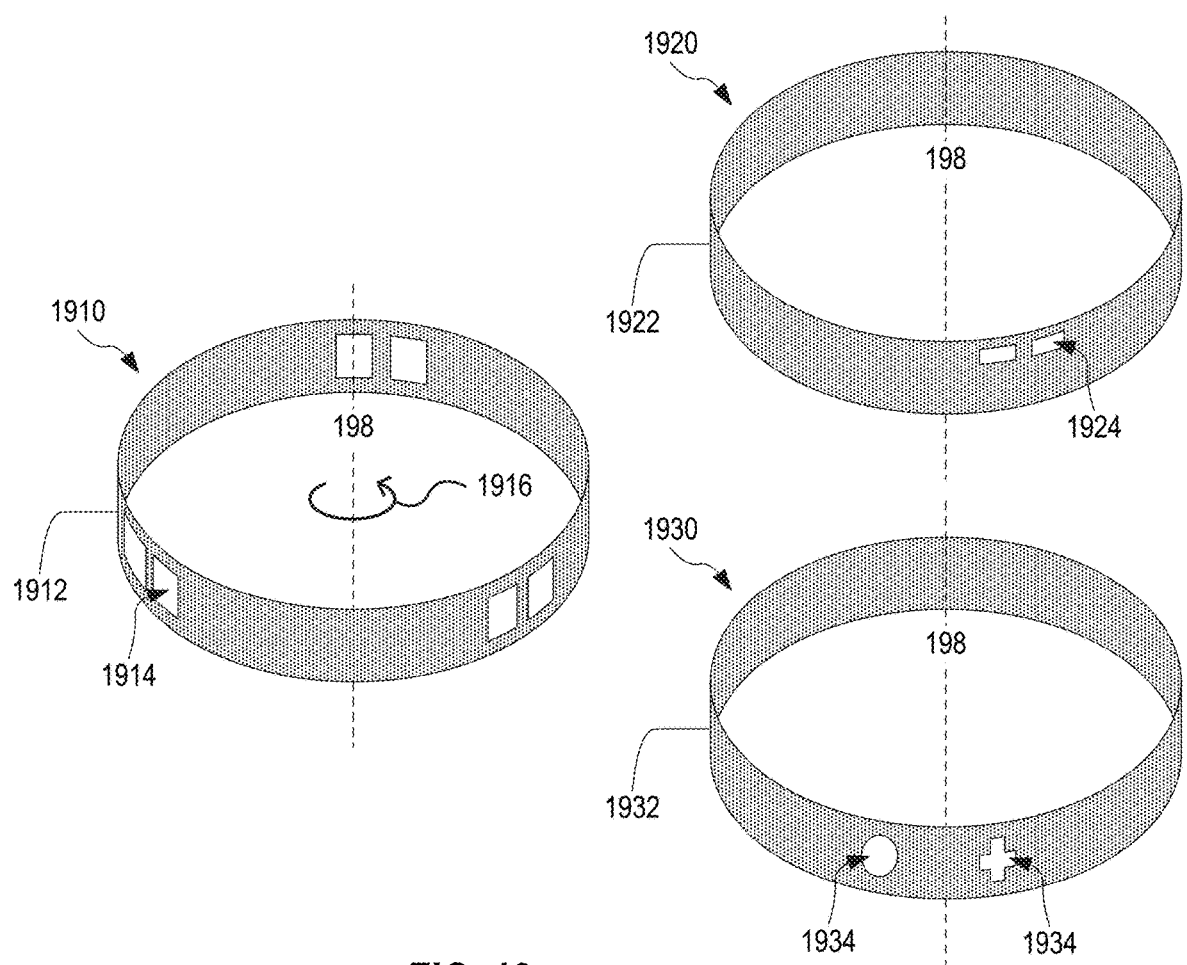
FIG. 19 illustrates certain alternative configurations of holes pierced in a radial wall by stamping station, according to embodiments.

FIG. 19 illustrates certain alternative configurations of holes pierced in a radial wall by stamping station 100. A ring 1910 has a radial wall 1912 with a plurality of holes 1914 that are not equidistantly spaced in the azimuthal dimension 1916. Another ring 1920 has a radial wall 1922 with holes 1924 pierced in locations that are not centered on radial wall 1922 in the axial dimension. Yet another ring 1930 has a radial wall 1932 with a plurality of holes 1934 that are not identical in shape. It is understood that each of the radial walls discussed in reference to FIGS. 1-18 may have holes according to one or more of the configurations shown in FIG. 19.

Figure 20:
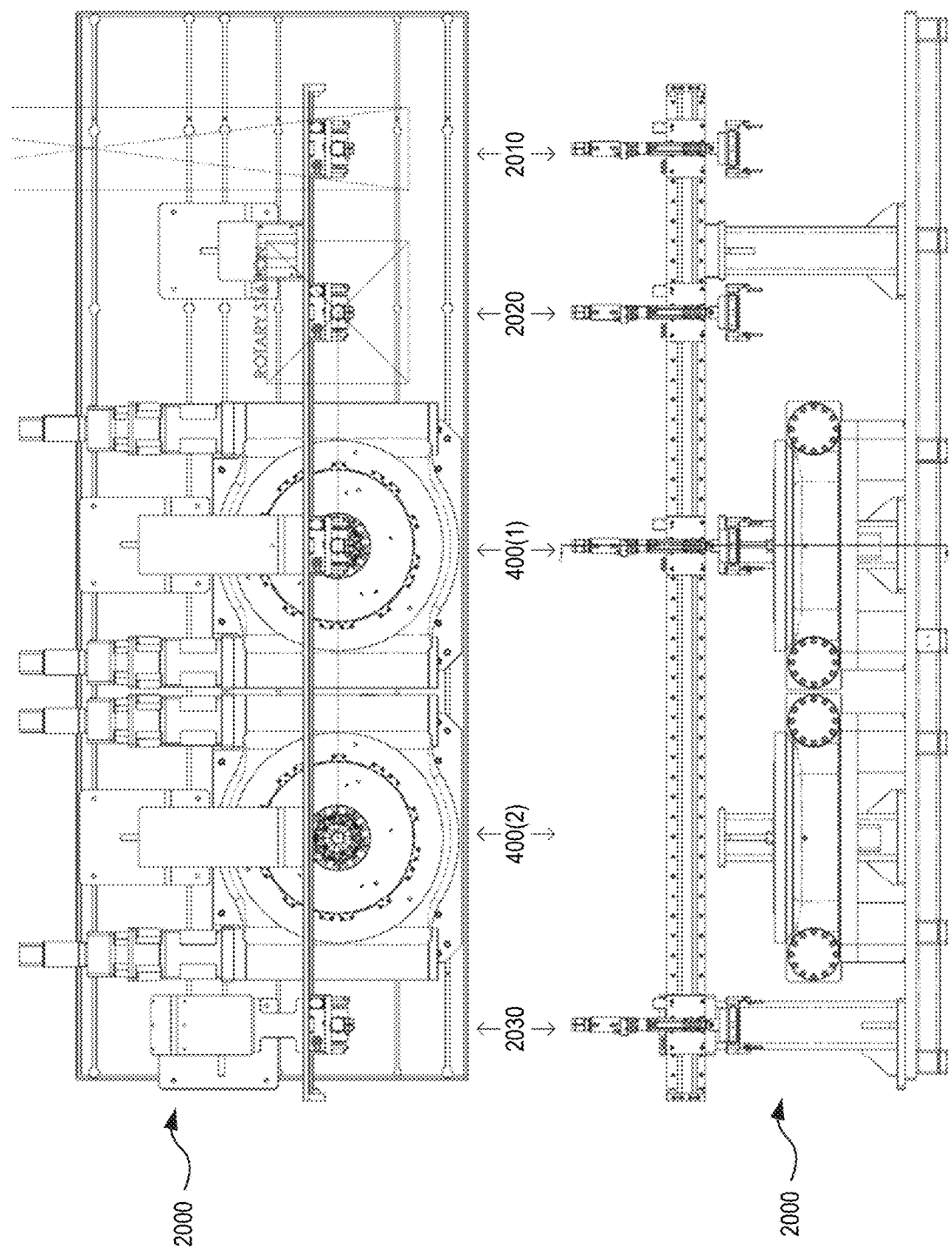
FIG. 20 illustrates another stamping system, according to an embodiment.

FIG. 20 illustrates one exemplary stamping system 2000 in top view (top of FIG. 20) and side view (bottom of FIG. 20). Stamping system 2000 includes two instances 400(1) and 400(2) of stamping station 400. The two stamping stations 400(1) and 400(2) may pierce different hole patterns. Stamping system 2000 receives a part at location 2010. When configured for handling rings with a weld (such as when forming the ring by roll-forming a flat sheet), a gripper moves the part to a rotary station 2020 that orients the weld according to a predefined orientation. For rings that do not have a weld, or if the weld orientation is not significant, stamping system 2000 may omit rotary station 2020. Next, a gripper moves that part to a first stamping station 400(1) for stamping of one or more first holes. Subsequently, a gripper moves the part to a second stamping station 400(2) for stamping of one or more second holes. The second hole(s) may be formed in the same radial wall as the first holes. Alternatively, if the part includes more than one radial wall or radial wall segments, the first and second hole(s) may be formed in respective first and second radial walls or wall segments. Stamping system 2000 may be configured to maintain a weld orientation through each station of stamping system 2000.

Since stamping system 2000 has two stamping stations 400, stamping system 2000 may be capable of piercing more holes than a single stamping station 400, for example if piercing of all holes by a single stamping 400 would result in distortion of the ring or require more power than can be supplied by a single stamping station 400.

System 2000 may be configured to transfer the pierced ring to another machine that further modifies the shape of the ring. For example, a gripper may transfer the ring to a roll-forming apparatus to change the shape of the radial wall.

FIG. 21 is a flowchart of one exemplary method 2100 for slew-actuated piercing a radial wall. Method 2100 may be performed by stamping station 100 as discussed in the foregoing. In a step 2110, method 2100 applies a radially outward pressure against a radially inward facing surface of the radial wall. In one example of step 2110, expandable core 120 applies radially outward pressure 122 against radially inward facing surface 196 of radial wall 192. Step 2110 may include one or more of steps 2112, 2114, 2116, and 2118. Optional step 2112 expands a core, e.g., expandable core 120, to apply the radially outward pressure, e.g., radially outward pressure 122. Optional step 2114 achieves final size and/or shape of the radially inward facing surface by virtue of the applied radially outward pressure. Optional step 2116 prevents burrs in the radial wall by virtue of the applied radially outward pressure. Optional step 2118 prevents distortion of the radial wall by virtue of the applied radially outward pressure.

In a step 2120, method 2100 drives at least one slew to actuate at least one punch to pierce, along a direction substantially opposite the radially outward pressure, at least one hole in the radial wall. Step 2120 may include one or both of steps 2122 and 2124. Step 2122 drives the slew(s) to rotate a drive ring, coupled to the slew(s) and each punch, to move each punch. In one example of step 2122, slew 112 rotates drive ring 130 to move punch(es) 110 radially inward along direction 150. Step 2124 guides movement of each punch along a radially-inward direction to pierce the radial wall. In one example of step 2124, guide 360 guides the movement of one or more punch bodies 340. Step 2122 and 2124 may be performed simultaneously.

Method 2100 may maintain the radially outward pressure of step 2110 while performing step 2120.

Figure 22:
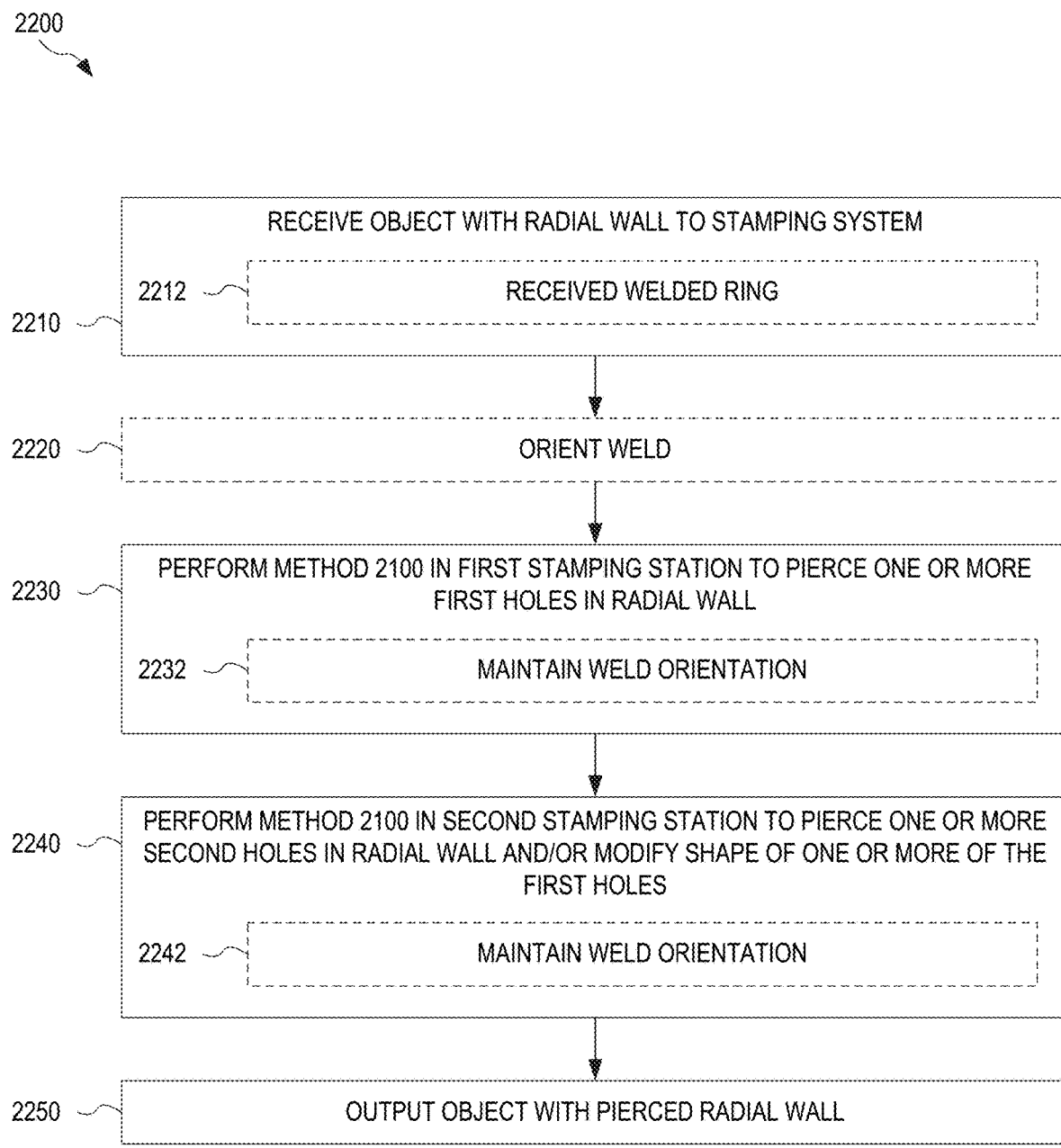
FIG. 22 is a flowchart of a method for performing a plurality of slew-actuated piercing operations on an object having a radial wall, according to an embodiment.

FIG. 22 is a flowchart of one exemplary method 2200 for performing a plurality of slew-actuated piercing operations on an object having a radial wall. Method 2200 is for example performed by stamping system 2000 as discussed above in reference to FIG. 20.

In a step 2210, the stamping system receives an object with a radial wall. In one example of step 2210, stamping system 2000 receives part 190. In a step 2230, method 2200 performs method 2100 in a first stamping station to pierce one of more first holes in the radial wall. In one example of step 2230, stamping station 400(1) of stamping system 2000 pierces one or more holes 194 in radial wall 192. In a step 2240, method 2200 performs method 2100 in a second stamping station to pierce one of more second holes in the radial wall. In one example of step 2240, stamping station 400(2) of stamping system 2000 pierces one or more additional holes 194 in radial wall 192. In a step 2250, method 2200 outputs the object with the pierced radial wall.

In one embodiment of method 2200, the object is a welded ring. This welded ring may have a weld seam used to complete roll-forming of a ring from a flat sheet. In this embodiment, (a) step 2210 implements a step 2212 of receiving a welded ring, (b) method 2200 further includes a step 2220 of orienting the weld seam, for example such that the weld seam is away from locations to be pierced in a subsequent step of method 2200, (c) step 2230 implements a step 2232 of maintaining the weld seam orientation, and (d) step 2240 implements a step 2242 of maintaining the weld seam orientation. In one example of this embodiment of method 2200, stamping system 2000 receives part 190, wherein radial wall 192 has a weld seam that is parallel to axis 198, and one or more grippers (such as gripper 460) orients part 190 and maintains its orientation such that the weld seam is away from any location to be pierced by a stamping station 400.

Without departing from the scope hereof, method 2200 may omit step 2240.

Figure 23:
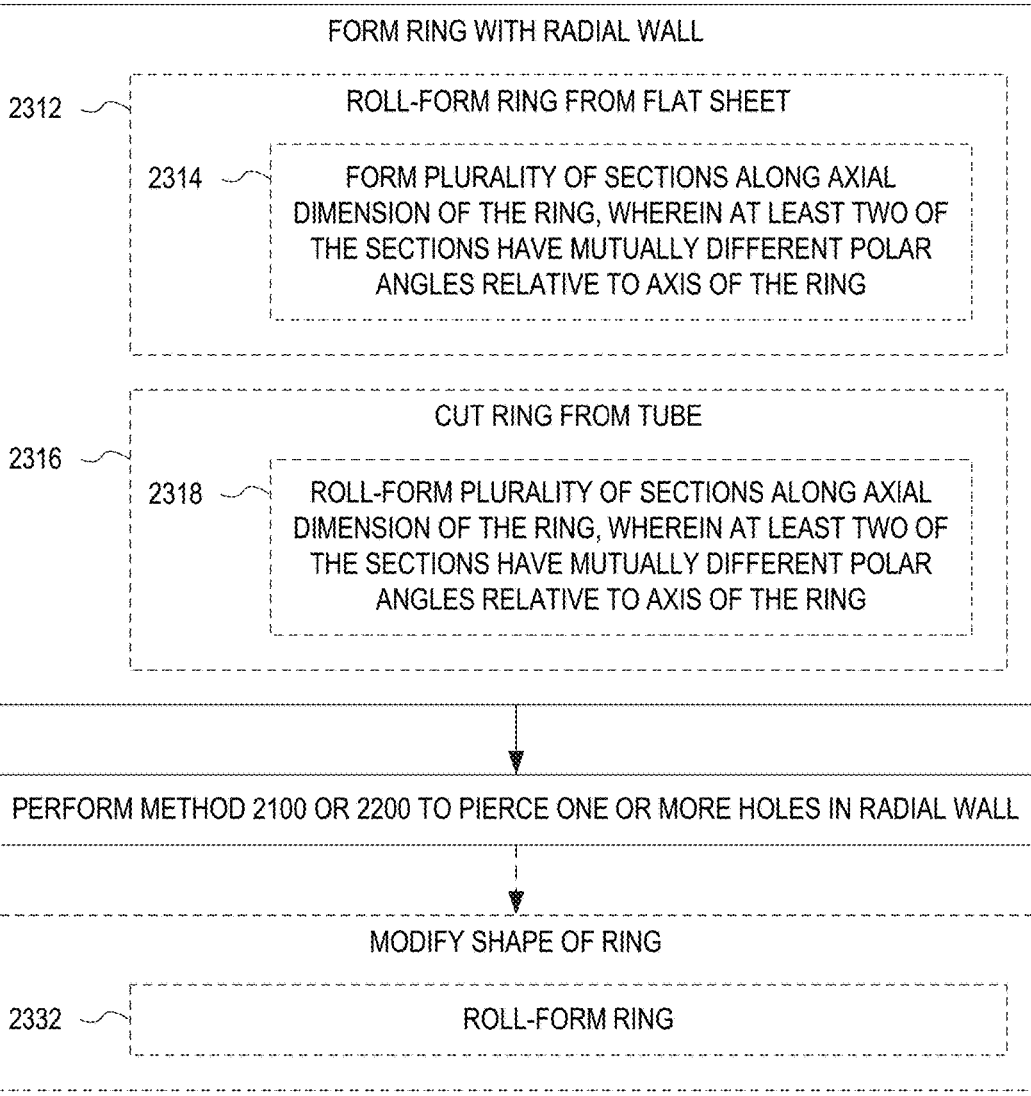
FIG. 23 is a flowchart of a method for forming an object having a radial wall with holes, according to an embodiment.

FIG. 23 is a flowchart of one exemplary method 2300 for forming an object having a radial wall with holes. In certain embodiments, method 2300 combines advantages of roll-forming (e.g., material savings) with the efficient slew-actuated piercing process of method 2100.

In a step 2310, method 2300 forms a ring with a radial wall. In one embodiment, step 2310 includes a step 2312 of roll-forming the ring from a flat sheet. This roll-forming process may produce a ring that has a weld seam. Step 2312 may include a step 2314 of forming a plurality of sections along the axial dimension of the ring, wherein at least two of the sections have mutually different polar angles relative to axis of the ring. Herein, "polar angle relative to the axis" refers to the angle of the ring relative to the axis in a planar cross section that includes the axis (e.g., axis 198), equivalent to the polar angle of a spherical coordinate system. FIGS. 14A, 14B, 16A, and 16B show examples of rings with sections that have different polar angles relative to axis 198. In another embodiment, step 2310 includes a step 2316 of cutting the ring from a tube. Step 2316 may include a step 2318 of roll-forming the cut ring to have a plurality of sections along the axial dimension of the ring, wherein at least two of the sections have mutually different polar angles relative to axis of the ring.

In a step 2320, method 2300 performs method 2100 or method 2200 to pierce one or more holes in at least one radial wall of the ring.

Method 2300 may further include a step 2330 of modifying the shape of the pierced ring. Step 2330 may include a step 2332 of roll-forming the pierced ring. In one example of step 2330, the shape of ring 190 is modified after piercing by stamping system 2000 or stamping station 400.

Figure 24:
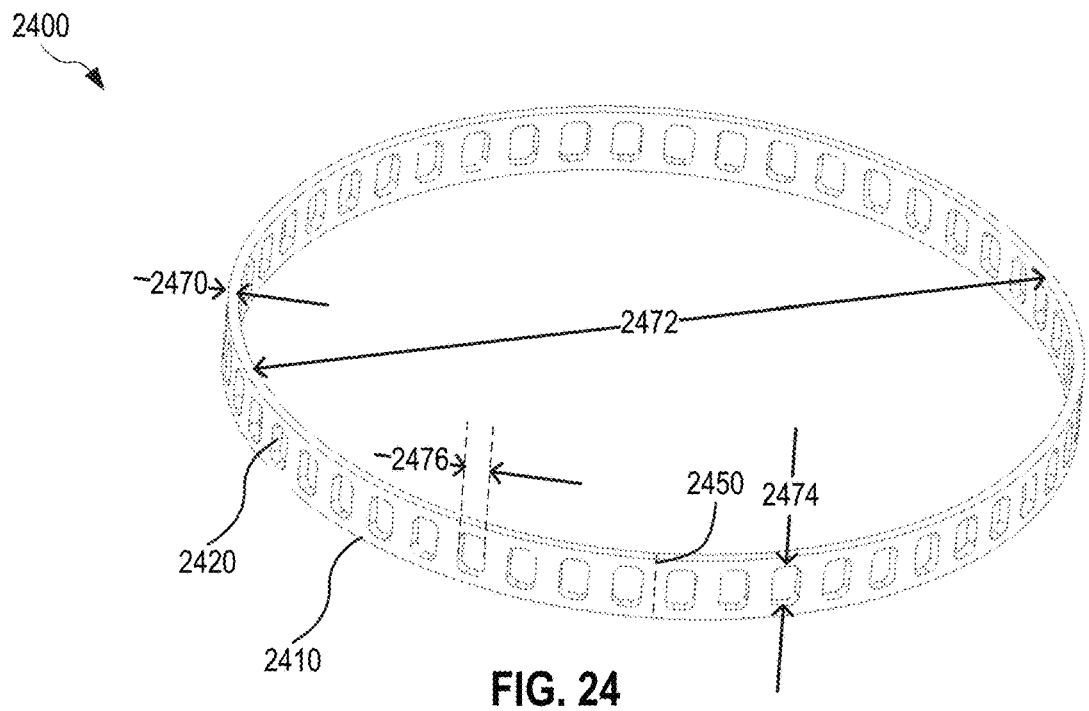
FIG. 24 illustrates a speed ring, according to an embodiment.

FIG. 24 illustrates one exemplary speed ring 2400 that has been pierced by stamping station 100 according to method 2100. Speed ring 2400 has a cylindrical wall 2410 with a plurality of holes 2420 formed by stamping station 100. Speed ring 2400 is similar to cylindrical ring 1300. In an embodiment, speed ring 2400 is roll-formed from a flat sheet and welded at the seam, prior to piercing of holes 2420 by stamping station 100. In this embodiment, stamping station 100 may maintain the orientation of the weld seam to ensure that no punches 110 go through the weld seam. An exemplary weld seam 2450 is indicated in FIG. 24. Alternatively, weld seam 2450 could be orientated such that punches 110 do go through weld seam 2450.

Speed ring may be made of steel, such as AISI low carbon steel, and have (a) diameter 2472 in the range between 5 and 10 inches and (b) radial wall thickness 2470 in the range between 0.05 and 0.2 inches, wherein each hole 2420 has height 2474 in the range between 0.1 and 5.0 inches and width in the range between 0.05 and 0.5 inches.

Figure 25:
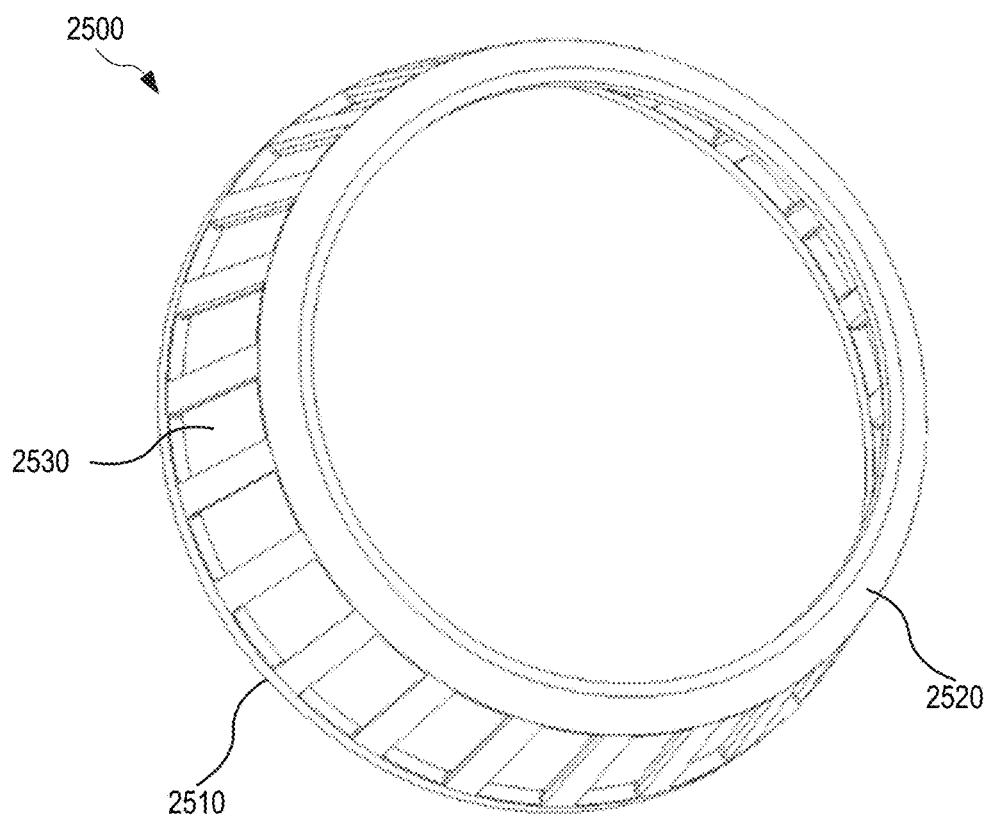
FIG. 25 illustrates a bearing cage, according to an embodiment.

FIG. 25 illustrates one exemplary bearing cage 2500 that has been pierced by stamping station 100 according to method 2100. Bearing cage 2500 includes a radial wall 2510 and a lip 2520. Radial wall 2510 has a plurality of holes 2530 formed by stamping station 100. Bearing cage 2500 is similar to pierced ring 1600. Each of holes 2530 may accommodate a tapered roller. Bearing cage 2500 may be of a material similar to that of speed ring 2400 and have similar dimensions.

Combinations of Features

Features described above as well as those claimed below may be combined in various ways without departing from the scope hereof. For example, it will be appreciated that aspects of one system or method for slew-actuated piercing of a radial wall, or associated part with a radial wall, described herein may incorporate or swap features of another system or method for slew-actuated piercing of a radial wall, or associated part with a radial wall, described herein. The following examples illustrate possible, non-limiting combinations of embodiments described above. It should be clear that many other changes and modifications may be made to the systems and methods described herein without departing from the spirit and scope of this invention:

(A1) A slew-actuated stamping station may include an expandable core configured to apply radially outward pressure to a radially inward facing surface of a radial wall, and at least one slew-actuated punch for piercing, along a radially inward direction, a respective hole in the radial wall.

(A2) The stamping station denoted as (A1) may further include (a) a drive ring, (b) at least one punch holder, each connecting one or more of the at least one slew-actuated punch to the drive ring, (c) a guide for guiding each punch holder toward the radial wall, and (d) a first slew for rotating the drive ring to drive each punch holder along the guide so as to pierce the radial wall with each slew-actuated punch.

(A3) In the stamping station denoted as (A2), one or more of the at least one punch holder may have exactly one punch mounted thereon.

(A4) In either of the stamping stations denoted as (A2) and (A3), one or more of the at least one punch holder may have more than one punch mounted thereon.

(A5) In any of the stamping stations denoted as (A2) through (A4), each punch holder may include (i) a punch body having the respective one or more of the at least one slew-actuated punch attached thereto, wherein the guide is configured to guide the punch body, and (ii) a lever connecting the punch body to the drive ring, wherein the lever is coupled both to the punch body, via a proximate joint that allows pivoting of the lever relative to the punch body, and to the drive ring, via a distal joint that allows pivoting of the lever relative to the drive ring, such that said rotation of the drive ring moves the punch body along the guide.

(A6) In the stamping station denoted as (A5), each punch holder may be configured to place the respective punch body at its radially most inward position when the lever is parallel to the punch body.

(A7) Any of the stamping stations denoted as (A2) through (A6) may further include a second slew for cooperating with the first slew to rotate the drive ring.

(A8) In the stamping station denoted as (A7), the first slew and the second slew may be coupled to opposite sides of the drive ring.

(A9) Any of the stamping stations denoted as (A1) through (A8) may further comprising a tapered plunger capable of moving along axial dimension of the radial wall, and the expandable core may include a plurality of tapered die segments arranged about the tapered plunger such that the tapered die segments move radially outward when the tapered plunger is moved to interface with the tapered die segments at a greater diameter of the tapered plunger.

(A10) In the stamping station denoted as (A9), the plurality of tapered die segments may include a respective plurality of radially outward facing surfaces for applying the outward pressure to the radially inward facing surface of the radial wall when the tapered plunger forces the tapered die segments radially outward.

(A11) In the stamping station denoted as (A10), the radially outward facing surfaces of the tapered die segments may approximate a final shape of the radially inward facing surface of the radial wall to achieve the final shape of the radial wall when the tapered die segments apply the radially outward pressure.

(A12) In the stamping station denoted as (A11), the final shape may be cylindrical or conical.

(A13) In either of the stamping stations denoted as (A11) and (A12), the final shape may be characterized by a circular cross section at every axial position within axial extent of the radial wall.

(A14) In any of the stamping stations denoted as (A9) through (A13), the tapered die segments may form one or more chutes configured to receive and drop material removed from the radial wall by said piercing.

(A15) In any of the stamping stations denoted as (A1) through (A14), the at least one slew-actuated punch may include a plurality of rectangularly shaped punches for piercing a respective plurality of rectangular holes in the radial wall.

(A16) In any of the stamping stations denoted as (A1) through (A15), the at least one slew-actuated punch may include a plurality of rectangularly shaped punches for piercing a respective plurality of holes at equidistant azimuthal positions of the radial wall.

(A17) Any of the stamping stations denoted as (A1) through (A16) may be implemented in a stamping system that further includes a second slew-actuated stamping station, wherein the second slew-actuated stamping station includes (I) a second expandable core for holding the radial wall after piercing of the radial wall in the slew-actuated stamping station, the second expandable core being configured apply radially outward pressure to the radially inward facing surface, and (II) at least one second slew-actuated punch for piercing, along a radially inward direction, at least one respective second hole in the radial wall or change shape of one or more of the at least one first hole.

(B1) A method for piercing a radial wall may include simultaneously (a) applying radially outward pressure against a radially inward facing surface of the radial wall, and (b) driving a slew to actuate at least one punch to pierce, along direction opposite the radially outward pressure, at least one hole in the radial wall.

(B2) In the method denoted as (B1), the step of applying may include expanding a core to apply the radially outward pressure.

(B3) In the method denoted as (B2), the step of expanding may include using a tapered plunger to push a plurality of tapered die segments, positioned inside the radial wall, radially outward.

(B4) In any of the methods denoted as (B1) through (B3), the step of applying may include achieving a final shape of the radially inward facing surface.

(B5) In the method denoted as (B4), the step of applying may further include preventing at least one of (a) burrs in the radial wall and (b) distortions of the radial wall.

(B6) In either of the methods denoted as (B4) and (B5), the step of achieving may include achieving that the radially inward facing surface has circular cross section at every axial position of the radial wall.

(B7) In any of the methods denoted as (B4) through (B6), the step of achieving may include achieving that the radially inward facing surface is cylindrical or conical.

(B8) In any of the methods denoted as (B1) through (B7), the step of driving may include (i) driving the slew to rotate a drive ring, coupled to the slew and each punch, so as to move each punch, and (ii) guiding movement of each punch along a radially-inward direction to pierce the radial wall.

(B9) In the method denoted as (B8), the step of driving may include moving a plurality of punches coupled to the drive ring, and guiding each of the punches along a respective radially-inward direction to pierce a plurality of holes in the radial wall.

(B10) The method denoted as (B9) may include (I) in the step of driving, azimuthally shifting position of distal end of each of at least one lever coupled to the drive ring, and (II) in the step of guiding, guiding radially-inward movement of each of at least one punch body that (1) is connected to proximate end of a respective one of the at least one lever and (2) has one or more respective ones of the at least one punch mounted thereon, to pierce the at least one hole.

(B11) Any of the methods denoted as (B1) through (B10) may include performing the steps of applying and driving in a first stamping station to pierce at least one hole in the radial wall, and performing the steps of applying and driving in a second stamping station to pierce at least one second hole in the radial wall or change shape of one or more of the at least one first hole.

(C1) A method for forming an object having a radial wall with holes may include forming a ring with a radial wall, and piercing at least one hole in the radial wall with at least one slew-actuated punch.

(C2) The method denoted as (C1) may further include, after the step of piercing, modifying shape of the ring.

(C3) In the method denoted as (C2), the step of modifying may include roll-forming the ring.

(C4) In any of the methods denoted as (C1) through (C3), the step of piercing may include applying radially outward pressure against a radially inward facing surface of the radial wall, and driving a slew to actuate at least one punch to pierce, along direction opposite the radially outward pressure, at least one hole in the radial wall.

(C5) In the method denoted as (C4), the step of applying may include achieving a final shape of the radial wall.

(C6) In either of the methods denoted as (C4) and (C5), the step of applying may further include preventing at least one of (a) burrs in the radial wall and (b) distortions of the radial wall.

(C7) In any of the methods denoted as (C1) through (C6), the step of forming may include roll-forming a flat sheet into a ring.

(C8) In the method denoted as (C7), the step of roll-forming may further include roll-forming, in the ring, a plurality of sections along axial dimension of the ring, at least two of the sections having mutually different polar angles relative to axis of the ring.

(C9) In any of the methods denoted as (C1) through (C6), the step of forming may include cutting the ring from a tube.

(C10) In any of the methods denoted as (C1) through (C9), the step of forming may include forming the ring such that the radial wall is cylindrical or conical.

(C11) In any of the methods denoted as (C1) through (C10), the step of forming may include forming the ring such that cross section of the radial wall, at every axial position, is circular.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A slew-actuated stamping station, comprising:
    an expandable core configured to apply radially outward pressure to a radially inward facing surface of a radial wall;
    at least one slew-actuated punch for piercing, along a radially inward direction, a respective hole in the radial wall;
    a drive ring;
    at least one punch holder, each connecting one or more of the at least one slew-actuated punch to the drive ring;
    a guide for guiding each of the at least one punch holder toward the radial wall;
    a first slew for rotating the drive ring to drive each of the at least one punch holder along the guide to pierce the radial wall with each of the at least one slew-actuated punch;
    a punch body attached to respective one or more of the at least one slew-actuated punch, the guide being configured to guide the punch body; and
    a lever connecting the punch body to the drive ring, the lever being coupled to (a) the punch body via a proximate joint that allows the lever to pivot relative to the punch body, and (b) the drive ring via a distal joint that allows the lever to pivot relative to the drive ring, such that the drive ring, when being rotated by the first slew, moves the punch body along the guide.

2. The stamping station of claim 1, one or more of the at least one punch holder having exactly one punch mounted thereon.

3. The stamping station of claim 1, one or more of the at least one punch holder having more than one punch mounted thereon.

4. The stamping station of claim 1, each of the at least one punch holder being configured to place the respective punch body at its radially most inward position when the lever is parallel to the punch body.

5. The stamping station of claim 1, further comprising a second slew for cooperating with the first slew to rotate the drive ring.

6. The stamping station of claim 5, the first slew and the second slew being coupled to opposite sides of the drive ring.

7. The stamping station of claim 1, the at least one slew-actuated punch including a plurality of rectangularly shaped punches for piercing a respective plurality of rectangular holes in the radial wall.

8. The stamping station of claim 1, the at least one slew-actuated punch including a plurality of rectangularly shaped punches for piercing a respective plurality of holes at equidistant azimuthal positions of the radial wall.

9. The stamping station of claim 1, being implemented in a stamping system that further includes a second slew-actuated stamping station comprising:
    a second expandable core for holding the radial wall after piercing of the radial wall in the slew-actuated stamping station, the second expandable core being configured to apply radially outward pressure to the radially inward facing surface; and
    at least one second slew-actuated punch for piercing, along the radially inward direction, at least one respective second hole in the radial wall, or for changing shape of any hole punched by the at least one slew-actuated punch.

* * * * *